No. 753,316. Patented March 1, 1904.

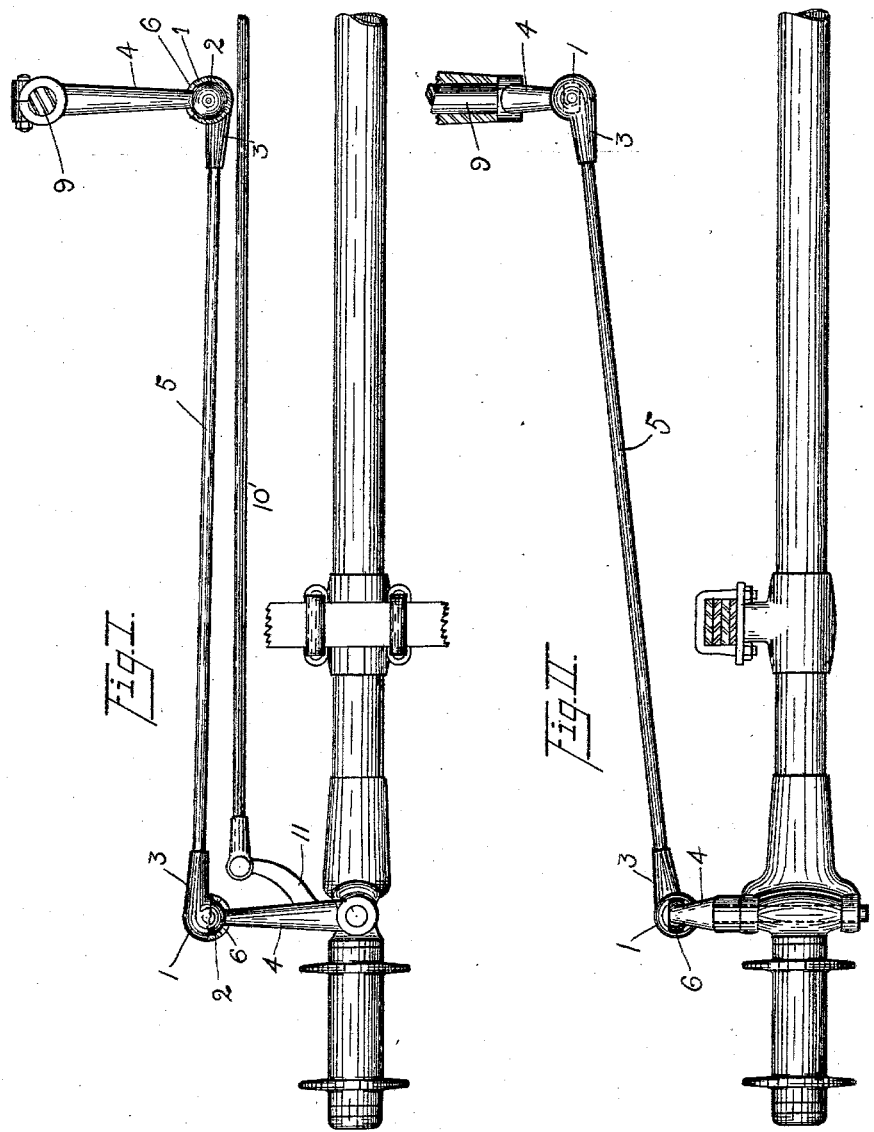

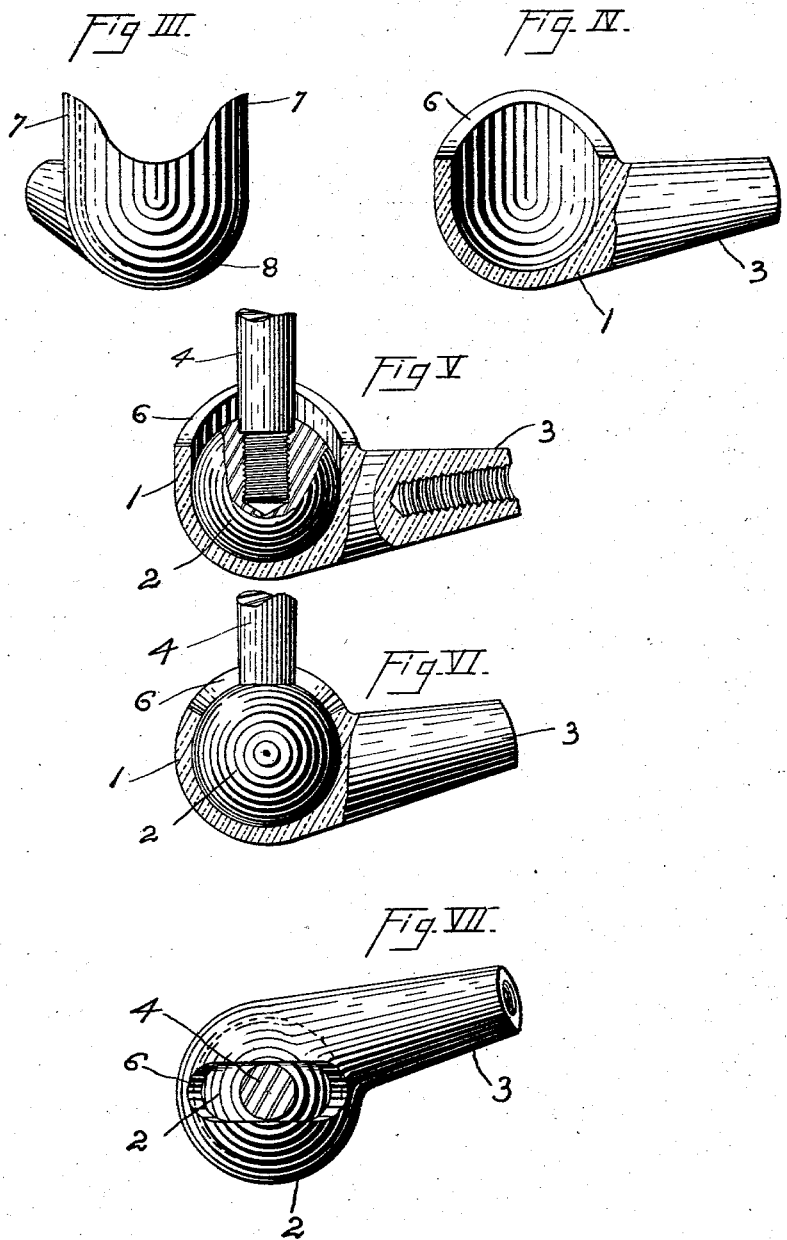

UNITED STATES PATENT OFFICE.

EDWIN L. RUSSELL, OF CLEVELAND, OHIO.

STEERING CONNECTION FOR MOTOR-VEHICLES.

SPECIFICATION forming part of Letters Patent No. 753,316, dated March 1, 1904.

Application filed May 4, 1903. Serial No. 155,470. (No model.)

*To all whom it may concern:*

Be it known that I, EDWIN L. RUSSELL, a citizen of the United States, residing at Cleveland, Ohio, have invented a Steering Connection for Motor-Vehicles, of which the following is a specification.

This invention relates to steering mechanism for motor-vehicles, and particularly to a steering connection; and the object is to provide a simple device which will be strong and durable and light and easily operated.

Other objects and advantages will be explained in the following description, and the invention will be more particularly pointed out in the claims.

Reference is had to the accompanying drawings, which form a part of this application and specification.

Figure I is a plan view, the sockets being shown in section. Fig. II is a front elevation. Fig. III illustrates the socket as it is first cast, the view being a perspective view. Fig. IV is a broken horizontal section. Fig. V is a broken horizontal section of the socket and also of the ball, showing the manner of connecting the steering-lever and the tie-rod. Fig. VI is a horizontal section of the socket, the ball being shown in place. Fig. VII is a side elevation showing the ball in the socket.

Similar characters of reference are used to indicate the same parts throughout the several views.

This invention consists of the socket 1 and the ball 2, with the boss 3 on the socket, the steering-arms 4, and the tie-rod 5.

Figures I and II show the invention applied to the steering-knuckle of an axle.

The socket 1 and the ball 2 form a universal joint. The socket 1 has a slot 6 to permit movement of the steering-arm 4. This arm 4 is screwed into the ball 2. The socket 1 incloses the ball 2, enveloping it completely except just enough to permit the movement of the arm 4. The socket 1 differs from other sockets in that it is a substantially hollow sphere which is uniform and smooth and made of a single piece of metal, having a boss 3 integral therewith. The socket is first cast in the form shown in Fig. III, with lips 7 extending outward from the bowl part 8. A die is used to hammer or press or stamp the bowl and lips compact and smooth and to a uniform thickness. The ball is then placed in the socket, and then the socket is put in a die, where the lips 7 are pressed to a spherical form uniform with the bowl part, leaving only the slot 6 for the movement of the steering-arm 4. A hole is made in the ball and threaded to receive the arm 4, which is screwed into the ball. The boss 3 has a threaded hole 8 therein to receive the tie-rod 5. One of the arms 4 is the knuckle-arm, and the other arm 4 is to be connected to the steering-lever of the vehicle and connected to the steering-lever through the shaft 9. A tie-rod 10 is provided and connected to the knuckle-lever 11 and to be connected to a similar lever for the other knuckle. The boss 3 is set off the center of the socket relative to the ball, and the slot is formed at an angle with the boss to permit freedom of steering by means of the tie-rod 5, which rises at an angle from the knuckle-arm 4 to permit it to connect with steering-arm 4. The socket must be made of some malleable or ductile metal that is capable of being formed in a press.

This connection may be made of any suitable size, and the connections for the arms and tie-rods may be varied without departing from my invention.

Having fully described my invention, what I claim as new, and desire to secure by Letters Patent, is—

1. A steering connection for motor-vehicles comprising a socket of a single piece of metal and having a boss for making connection therewith, a ball inclosed in said socket, and an arm screwed into said ball, said socket having a slot for the movement of said arm.

2. A steering connection for motor-vehicles comprising a ball having an arm screwed therein and a socket of a single piece of metal inclosing said ball and having a boss integral therewith for making connection with a tie-rod, said socket having a slot therein for the movement of said arm.

3. A steering connection for motor-vehicles comprising a ball having an arm attached thereto and a socket spherical in form and of a single piece of metal inclosing said ball and having a boss integral therewith, said socket having a slot for the movement of said arm.

4. A steering connection for motor-vehicles comprising a ball having an arm attached thereto and a socket of a single piece of metal inclosing said ball and having a boss integral therewith set off the center relative to said ball, a slot being made in said socket for the movement of said arm.

5. A steering connection for motor-vehicles comprising a ball having an arm attached thereto and a socket of a single piece of metal inclosing said ball and having a boss integral therewith and set off center relative to said ball, a slot being formed in said socket at an angle with said boss for said arm.

6. A steering connection for motor-vehicles comprising a ball having an arm attached thereto and a socket of a single piece of metal inclosing said ball and having a boss integral therewith and set off the center relative to said ball to be connected with a tie-rod, a slot being formed in said socket for said arm, said slot being formed at an angle to said boss to permit freedom of movement of steering the tie-rod.

In testimony whereof I set my hand, in the presence of two witnesses, this 2d day of May, 1903.

EDWIN L. RUSSELL.

Witnesses:
  E. J. THOBABEN,
  ALBERT BOYER.